United States Patent
Parkinson et al.

(10) Patent No.: US 10,318,520 B2
(45) Date of Patent: *Jun. 11, 2019

(54) SYSTEM AND METHOD FOR REDUCING COMMUNICATIONS OVERHEAD IN A DISTRIBUTED TRANSACTIONS ENVIRONMENT BY MODIFYING IMPLEMENTATION OF THE TRANSACTION END FUNCTION

(71) Applicant: Oracle International Corporation, Redwood Shores, CA (US)

(72) Inventors: Paul Parkinson, Mount Laurel, NJ (US); Todd J. Little, Palatine, IL (US); Carol Colrain, Redwood Shores, CA (US); Jean De Lavarene, Versailles (FR); Vivekanandhan Raja, Fremont, CA (US); Douglas Surber, Orinda, CA (US); Stefan Roesch, San Mateo, CA (US); Nancy Ikeda, Los Altos Hill, CA (US); Kevin Neel, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 15/087,896

(22) Filed: Mar. 31, 2016

(65) Prior Publication Data

US 2016/0294726 A1 Oct. 6, 2016

Related U.S. Application Data

(60) Provisional application No. 62/140,547, filed on Mar. 31, 2015.

(51) Int. Cl.
*G06F 9/46* (2006.01)
*G06F 16/23* (2019.01)

(52) U.S. Cl.
CPC .......... *G06F 16/2365* (2019.01); *G06F 9/466* (2013.01)

(58) Field of Classification Search
CPC ........................... G06F 17/30371; G06F 9/466
(Continued)

(56) References Cited

U.S. PATENT DOCUMENTS 5,920,863 A * 7/1999 McKeehan ............. G06F 9/466
  707/741
6,463,456 B1 * 10/2002 Kan ........................ G06F 9/466
  709/201

(Continued)

OTHER PUBLICATIONS

Oracle® Fusion Middleware, Programming Advanced Features of JAX-WS Web Services for Oracle WebLogic Server, 11g Release 1 (10.3.4), 256 pages, Jan. 2011.

*Primary Examiner* — Duyen M Doan
(74) *Attorney, Agent, or Firm* — Tucker Ellis LLP

(57) ABSTRACT

A system and method for reducing communications overhead in a distributed transaction processing environment such as an XA environment. In accordance with an embodiment communication overhead is reduced in a transaction by deferring a transaction end communication. The deferred transaction end communication is determined from a subsequent XA transaction communication thereby reducing the number of networks calls required for each transaction and enhancing system performance.

20 Claims, 3 Drawing Sheets

(58) Field of Classification Search
USPC .................................................. 709/225–226
See application file for complete search history.

(56) References Cited

U.S. PATENT DOCUMENTS

| | | | |
|---|---|---|---|
| 9,679,266 B2* | 6/2017 | Brown | G06Q 10/06316 |
| 2004/0078377 A1* | 4/2004 | Begg | G06F 16/25 |
| 2008/0307088 A1* | 12/2008 | Chen | G06F 11/3495 |
| | | | 709/224 |
| 2013/0066948 A1* | 3/2013 | Colrain | H04L 67/146 |
| | | | 709/203 |
| 2014/0157276 A1* | 6/2014 | Smithson | G06F 9/466 |
| | | | 718/101 |
| 2015/0088956 A1* | 3/2015 | Deshpande | G06F 9/466 |
| | | | 709/201 |
| 2015/0309889 A1* | 10/2015 | Campbell | G06F 11/1469 |
| | | | 714/16 |

* cited by examiner

SYSTEM AND METHOD FOR REDUCING COMMUNICATIONS OVERHEAD IN A DISTRIBUTED TRANSACTIONS ENVIRONMENT BY MODIFYING IMPLEMENTATION OF THE TRANSACTION END FUNCTION

CLAIM OF PRIORITY

This application claims the benefit of priority on U.S. Provisional Patent Application No. 62/140,547 filed Mar. 31, 2015 entitled "SYSTEM AND METHOD FOR REDUCING COMMUNICATIONS OVERHEAD IN A DISTRIBUTED TRANSACTIONS ENVIRONMENT BY MODIFYING IMPLEMENTATION OF THE TRANSACTION END FUNCTION" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for distributed transaction processing.

BACKGROUND

In today's computing environment the use of distributed or "global" transactions is becoming more widespread with the adoption of Java EE component based architectures. The XA standard is an X/Open specification for distributed transaction processing (DTP) across heterogeneous data sources (e.g. Oracle Database and DB2) that was published in 1991. A general overview of the XA specification for distributed transaction processing, including basic architecture Information can be found in the "X/Open CAE Specification—Distributed Transaction Processing: The XA Specification" (X/Open 1991) which is incorporated herein by reference. A copy of this document can be obtained by requesting X/Open Document No. XO/CAE/91/300 or ISBN 1 872630 24 3 from X/Open Company, Ltd., 1010 El Camino Real, Suite 380, Menlo Park, Calif. 94025, U.S.A. The XA specification describes the interface between the transaction coordinator and the data sources that participate in the distributed transaction. Within XA the transaction coordinator is termed the transaction manager and the participating data sources are termed the resource managers. Transaction managers and resource managers that follow the XA specification are said to be XA compliant.

Some products such as the Oracle database and Oracle WebLogic Server can act as either transaction managers or resource managers or both within the same XA transaction. Examples of XA transaction managers are: Oracle® Tuxedo, Oracle® WebLogic Server, the Oracle® database and IBM® WebSphere Application Server. Examples of XA resource managers are: Oracle® Database, IBM® DB2, MS-SQL, IBM® MQ-Series and Java Message Service (JMS). Additional information concerning design implications when using XA or Oracle® controlled distributed transactions can be found in "Oracle White Paper—XA and Oracle controlled Distributed Transactions" (Oracle 2010) which is incorporated herein by reference.

The XA specification thus describes a protocol and interface between an application server, transaction manager and one or more resource managers. The XA specification enables a plurality of resources, such as application servers and databases, to be accessed within the same transaction, thus preserving the ACID (atomicity, consistency, isolation, durability) properties of the transaction in a distributed transaction processing environment.

In order to ensure interoperability of components, the XA specification requires implementation of particular communications between the application server, transaction manager and one or more local resource managers. However such communications require a communications overhead that consumes network resources and introduces additional latency.

SUMMARY

A system and method is provided for reducing communications overhead in a distributed transaction processing environment such as an XA environment. In accordance with an embodiment, communication overhead is reduced in a transaction end method by deferring a transaction end communication. The deferred transaction end communication is determined from a subsequent transaction processing communication thereby reducing the number of network calls required for each transaction, reducing latency, and enhancing system performance.

Other objects and advantages of the present invention will become apparent to those skilled in the art from the following detailed description of the various embodiments, when read in light of the accompanying drawings.

DETAILED DESCRIPTION

Figure 1:
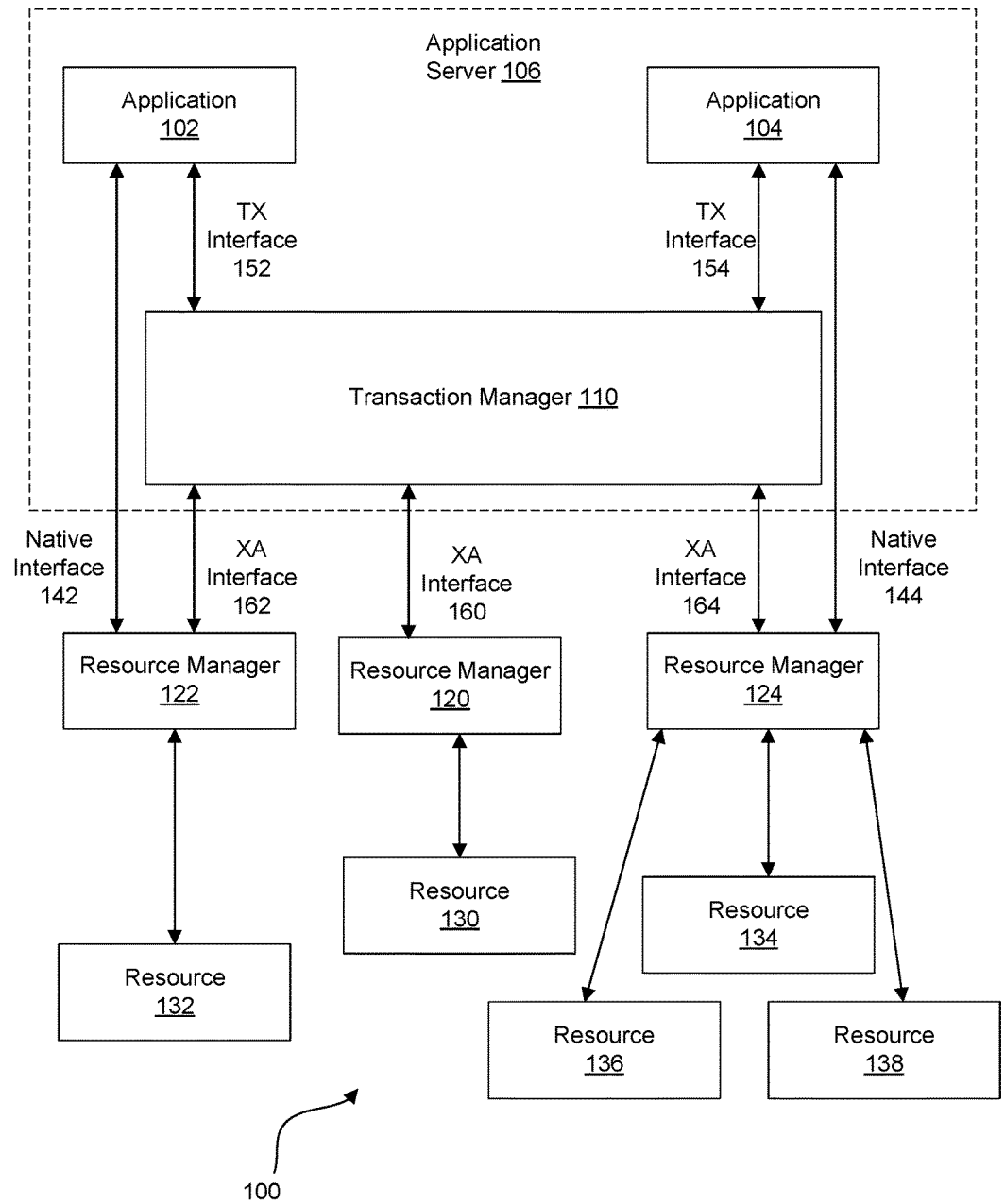
FIG. 1 shows an illustration of a distributed transactional environment, in accordance with an embodiment of the invention.

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention. In particular, the detailed description uses an XA distributed transaction environment as an example. It will be apparent to those skilled in the art that the present invention has application to other types of distributed transaction environment without limitation.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the figures in which the element first appears.

A Transactional Environment and Global Transaction

FIG. 1 illustrates a distributed transaction processing environment 100, in accordance with an embodiment of the invention. As shown in FIG. 1, each of one or more resource manager 120, 122, 124, controls access to one or more resources 130, 132, 134, 136, and 138. Examples of resources can include messaging systems, relational databases, and transactional file systems. A distributed transaction is one that includes updates to multiple resources—the transaction comprises multiple branches, each of which is a unit of work contained within a resource manager. Transaction manager 110 coordinates the flow of transaction requests between client applications 102, 103 that issue requests, and resources 130, 132, 134, 136, 138 that will be used to process those requests, including synchronizing any commits or rollbacks required to complete the transaction. Examples of commercially available transaction processing monitors include Oracle® Tuxedo, Oracle® WebLogic Server and application server-type systems.

The plurality of resource managers 120, 122, 124 provide access to resources 130, 132, 134, 136, 138 that can be, for example, persistence stores such as databases. The persistence stores can be in-memory or disk based. In accordance with an embodiment of the invention, the plurality of resource managers 120, 122, 124 implement XA interfaces 160, 162, 164 to handle database connections and disconnections transparently to persistence stores. The XA interfaces 160, 162, 164 are based on a specification that describes the protocol for transaction coordination, commitment, and recovery. An XA resource participating in a transaction can comprise an XA resource manager and a backend persistence store.

A distributed transaction processing environment may comprise a large number of resource managers and resources. Different resource managers and resources may participate in different transactions depending on the resource needs of the transaction. To put it another way, a particular subset of the available plurality resources may be required for a particular transaction. The particular subset of the available plurality resources and the resource managers managing those resources can be described as participating in the transaction or as participating resource managers. Other resources/resource managers may not be required for a particular transaction—non-participating. For different transactions different resources and resource managers may be required. Thus those resource managers participating in a first transaction may be different than those participating in a second transaction.

In accordance with embodiments of the invention, the applications 102, 104 hosted on application server 106 can specify actions that constitute a transaction. As illustrated, the applications 102, 104 communicate with the transaction manager 110 to start, and commit or abort, each transaction, and the transaction manager 110 can acknowledge the successful completion or failure of the start, end and disposition of each transaction to the applications 102, 104. The transaction manager 110 provides an application programming interface (in XA-based environments the XA protocol and its TX interfaces 152, 154) that enable the applications 102, 104 to specify the boundaries of each transaction. In accordance with embodiments of the present invention, the communications of the XA protocol implemented by the transaction manager 110 and resource managers 122, 124 to specify the boundaries of each transaction are modified to reduce communications overhead. In particular communication overhead is reduced in a transaction end method by deferring a transaction end communication as described below thereby reducing the number of network calls required for each transaction and enhancing system performance. The application server 106, transaction manager 110, and resource managers 122, 124 are configured to implement the reduced overhead method described below and illustrated in FIG. 3.

Each transaction monitor implements a two-phase commit protocol to provide all-or-none semantics across its distributed resource managers. During a prepare phase of a transaction, the transaction monitor uses its XA interface 162, 164 to ask each resource manager participating in a transaction to guarantee that it can commit its part of the transaction. If this is possible, then the resource manager records its prepared state and replies affirmatively to the transaction monitor; if not then the resource manager might roll back any work and reply negatively to the transaction monitor. The XA protocol allows the applications 102, 104, or any of the resource managers 122, 124, to roll back the transaction unilaterally until the prepare phase completes. During a commit phase of a transaction, the transaction manager 110 records the commit decision and issues either a commit or rollback to all resource managers 102, 104 participating in the transaction. The transaction processing monitor 11 issues a commit for a resource manager 122, 124 only if all of the resource managers 102, 104 participating in the transaction have replied affirmatively during the prepare phase.

Although the applications 102, 104 can specify the transaction boundaries and the actions that constitute a transaction using transaction manager 110, the applications otherwise operates on each resource manager 120, 124 through its native interface 142, 144. For example, in the case of a SQL-based database resource, the application might operate on the database's resource manager using SQL commands. Thus applications 102, 104 can communicate directly with the plurality of resource managers 122-124 via native interfaces 142, 144 e.g. embedded Structured Query Language (SQL) to do useful work.

In accordance with various embodiments of the invention, a transactional system can support a global transaction, which can be executed on more than one server, and is capable of accessing data from more than one resource manager. A global transaction can be treated as a specific sequence of operations that are characterized by the four properties of atomicity, consistency, isolation, and durability (ACID). The global transaction can be a logical unit of work that has the following features:

All portions either succeed or have no effect.
Operations are performed that correctly transform the resources from one consistent state to another.
Intermediate results are not accessible to other transactions, although other processes in the same transaction may access the data.

All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Additionally, the transaction manager 110 can assign global transaction identifiers (GTRIDs) to the different transactions in transactional environment 100. The transaction manager 110 can monitor the progress of transactions, and take responsibility for ensuring transaction completion and providing failure recovery. In addition, the transaction manager 110 can communicate with the plurality of resource managers 122-124 via XA interfaces to exchange transaction information, such as sending two-phase commits calls to the resource managers 122, 124.

Standard XA Interface

The xa_resource routines are supplied by resource managers operating in the distributed transaction environment and called by transaction monitors. When an application calls a transaction monitor to a global transaction, the transaction monitor may use the xa.resource interface to inform resource managers of the transaction branch. After the application uses the resource manager's native interface to do work in support of the global transaction, the transaction monitor calls additional XA routines to end the transaction and prepare, commit or roll back branches. One other XA routine helps the transaction monitor coordinate failure recovery.

TABLE I

| Name | Description |
| --- | --- |
| xa_close | Terminate the applications use of a resource manager. |
| xa_commit | Tell the resource manager to commit a transaction branch. |
| xa_complete | Test an asynchronous XA operation for completion. |
| xa_end | Dissociate the thread from a transaction branch. |
| xa_forget | Permit the resource manager to discard its knowledge of a heuristically-completed transaction branch. |
| xa_open | Initialize a resource manager for use by an application. |
| xa_prepare | Ask the resource manager to prepare to commit a transaction branch. |
| xa_recover | Get a list of XIDs the resource manager has prepared or heuristically completed. |
| xa_rollback | Tell the resource manager to roll back a transaction branch. |
| xa_start | Start or resume a transaction branch - associate an XID with future work that the thread requests of the resource manager. |

Figure 2:
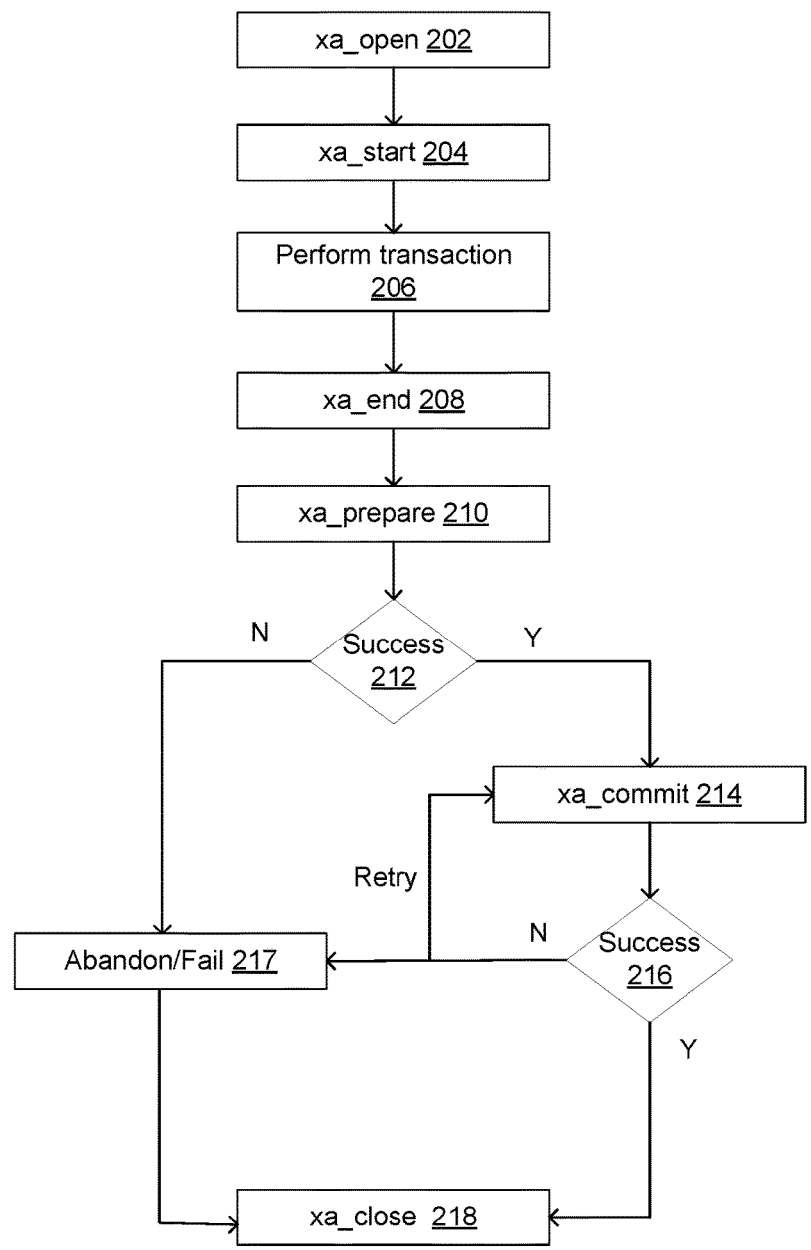
FIG. 2 shows a conventional sequence of steps for an XA transaction.

A list of conventional XA routines is provided in Table I above. A transaction processing monitor calls the XA routines in a particular sequence specified in the XA protocol. FIG. 2 is a chart showing the flow of calls when performing a transaction in a distributed database using XA protocol.

At step 202, xa_open is called by the transaction manager to initialize one or more resource managers and prepare them for use in a distributed transaction environment. All participating resource managers must respond to the transaction manager to acknowledge successful performance of the xa_open routine before the transaction proceeds (or communicate an exception if the routine failed). Note that xa_open is not actually implemented by Java XA such as Oracle® WebLogic Server but is implemented in C implementations such as Oracle® Tuxedo.

At step 204, xa_start is called by the transaction manager to start one or more transaction branches and associate an XID with future work that the thread requests of the resource managers participating in the transaction. If there are multiple resource managers (e.g. 122, 124 of FIG. 1) participating in the transaction, each resource manager is a separate branch. Resource managers must respond to the transaction manager to acknowledge successful performance of the xa_start routine before the transaction proceeds (or communicate an exception if the routine failed). Note that particular transactions may not involve all resources/resource managers. Transaction-specific communications as described herein need only be performed with respect to resource managers participating in a particular transaction and not other resource managers (e.g. 120 of FIG. 1) which are not participating in a particular transaction.

At step 206, the application 102 goes ahead with the transaction. For example, the application can perform a transactions in a database using by communicating with the plurality of resource managers 122-124 via a native interface such as e.g. embedded Structured Query Language (SQL) to do useful work in a database.

Note that, the xa_start call (step 204) in the methodology is transmitted from the transaction manager 110 over the XA Interface 162, 164 to the resource managers 122, 124 (See FIG. 1). The connection/statement/execute/work call (step 206) is made by the application 102, 104 to the resource manager 122, 124 over the native interface 142, 144 using e.g. SQL commands.

At step 208, xa_end is called by the transaction manager to mark the end of the transaction on each transaction branch and dissociate an application thread from the transaction branches. All participating resource managers must respond to the transaction manager to acknowledge successful performance of the xa_start routine before the transaction proceeds (or communicate an exception if the routine failed).

At step 210, xa_prepare is called by the transaction manager as the first phase of the two phase commit. All participating resource managers must respond to the transaction manager to acknowledge successful performance of the xa_prepare routine for the transaction to succeed.

At step 212, if one or more of the resource managers do not respond positively to the xa_prepare call, xa_rollback is called by the transaction manager.

At step 214, if all of the resource managers respond positively to the xa_prepare call, xa_commit is called by the transaction manager. All participating resource managers must respond to the transaction manager to acknowledge successful performance of the xa_commit routine for the transaction to succeed.

At step 216, if one or more of the resource managers do not respond positively to the xa_commit call, depending on the XA error code returned, xa_commit will be retried or the transaction will be abandoned at step 217. At this point the transaction has either succeeded and been committed on all participating resource managers or has failed on all participating resource managers. The transaction thus satisfies the atomicity requirement of the global transaction—characterized by the four properties of atomicity, consistency, isolation, and durability (ACID).

Finally, at step 218 the transaction manager calls xa_close to all of the participating resource managers 122, 124. The above sequence of steps is performed for each transaction performed by the applications 102, 104 using the resources 132, 134, 136, 138. Note however that xa_open and xa_close are typically only called on application startup and application shutdown instead rather than for each transaction. Note also that xa_open and xa_close are not actually implemented by Java XA such as Oracle® WebLogic Server but are implemented in C implementations such as Oracle® Tuxedo.

XA Interface with Reduced Communication Overhead

The Java Transaction API (JTA), one of the Java Enterprise Edition (Java EE) APIs, enables distributed transactions to be done across multiple X/Open XA resources in a Java environment. The JTA is modelled on the X/Open XA architecture, but it defines two different APIs for demarcating transaction boundaries. It distinguishes between an application server such as an EJB server and an application component. It provides an interface, javax.transaction.TransactionManager, that is used by the application server 106 itself to begin, commit and rollback the transactions. It provides a different interface, the javax.transaction.UserTransaction, which is used by general application client code 102, 104 such as a servlet or an EJB to manage the transactions.

The Java Transaction API (JTA) consists of three elements: a high-level application transaction demarcation interface, a high-level transaction manager interface intended for an application server 106, and a standard Java mapping of the XA protocol intended for a transactional resource manager 122, 124. The javax.transaction.UserTransaction interface provides the application the ability to control transaction boundaries programmatically. This interface may be used by Java client programs or EJB beans.

A global/XA transaction Java application generally has the following form:
1. userTransaction.begin( )//A global transaction is demarcated using JTA;
2. connection1.prepareStatement( ).execute( ); //Work is conducted on a resource manager such as a database;
3. connection2.prepareStatement( ).execute( ); //Work is conducted on another resource manager such as a database; and
4. userTransaction.commit( ); //A global transaction is completed/committed using JTA.

The UserTransaction.begin( ) method starts a global transaction and associates the transaction with the calling thread of the application. The transaction-to-thread association is managed transparently by the transaction manager 110. The application server 106 intercepts or wraps the application's 102, 104 first connection/statement execute/work call to a resource manager 122, 124 and first calls xa_start on the resource manager 102, 104 in order to demarcate the beginning of the transaction on the resource manager side. At the completion of the applications transactional work on the resource managers, the application server makes xa_end calls on all the participating resource managers to demarcate the end of the transaction before it conducts two-phase commit (two-phase commit involves the application server first calling xa_prepare on all the resource managers involved in a transaction and then (provided all resource managers reply with an XA_OK vote) calling xa_commit on all resources involved in a transaction).

This xa_end call is a full roundtrip network call to the resource manager/database from the application server resulting in communication overhead and delay resulting from the transmission of the call to resource manager and the response (OK or XAException) from the resource manager 122, 124 to the application server 106. If this xa_end call is successful, then xa_prepare call can be made to commence the two-phase commit phase.

In an embodiment of the present invention, the communications overhead of the conventional transaction pattern is reduced by deferring the xa_end call and either bundling it with the xa_prepare call or allowing the resource manager to determine/infer the existence of the xa_end call from the receipt of the subsequent xa_prepare call at the resource manager thus eliminating an entire network call for each resource manager in each transaction. The elimination of an entire network call for each resource manager in each transaction reduces the communications overhead and delay compared to the conventional transaction pattern.

In order to eliminate the explicit xa_end call and determine the xa_end call from the xa_prepare call to the resource manager the following procedure is used. First, when xa_end is called by the application server it is done with a special DEFERRED flag rather than the TMSUCCESS flag used currently. TMSUCCESS is used to indicate that the connection/statement execute/work portion of work has completed successfully. This use of the special DEFERRED flag sets a flag locally on the application server 106 and does not make a remote call to the resource manager 122, 124 for xa_end. The application server 106 proceeds to issue the xa_prepare call without waiting for a response to the xa_end call (because the call was not actually communicated). The xa_end call (or an indication thereof) can be bundled with the xa_prepare call. When the xa_prepare call is made, the resource manager 122, 124 receives the call and conducts the necessary work that would have resulted from both an explicit xa_end call and also conducts the work required by the xa_prepare call.

When the resource manager conducts the necessary work that would have resulted from an explicit xa_end, an XA exception could result. Also, if the xa_end is successful, when the resource manager conducts the necessary work for the xa_prepare call a different XA exception can occur. Either of these exceptions will be transmitted from the resource manager in the form of an XA exception thrown in response to the xa_prepare call however different error codes can be thrown for each type of exception. The application server will inspect any XA exception error codes. Thus, the application server 106 will be informed whether an XA exception was thrown in response to the xa_end call or the xa_prepare call and process the exceptions appropriately.

A further optimization occurs in the case where it is known by the application server that there is only one XA resource in a transaction or when all of the xa_prepare calls from all but the last XA resource to be prepared have returned a vote of XA_RDONLY. In this case there is no need to call xa_prepare on the only (or only remaining) resource. Thus, the application server forgoes calling xa_prepare on that resource and the xa_end call is deferred until the xa_commit call is made.

When the resource manager conducts the necessary work that would have resulted from an explicit xa_end, an XA exception could result. Also, if the xa_end is successful, when the resource manager conducts the necessary work for the xa_commit call a different XA exception can occur. Either of these exceptions will be transmitted from the resource manager in the form of an XA exception thrown in response to the xa_commit call however different error codes can be thrown for each type of exception. The application server will inspect any XA exception error codes. Thus, the application server 106 will be informed whether an XA exception was thrown in response to the xa_end call or the xa_commit call and process the exceptions appropriately.

Figure 3:
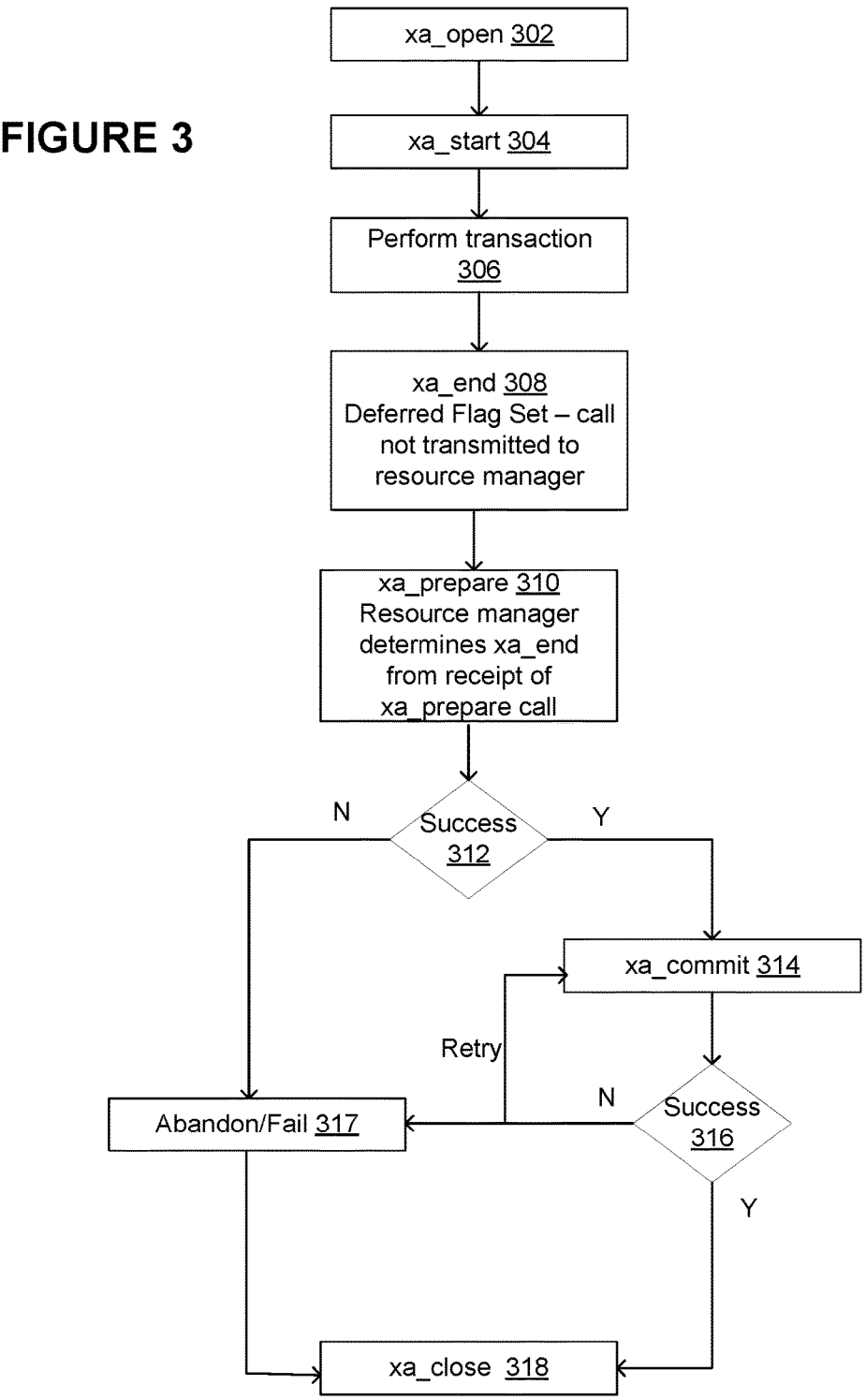
FIG. 3 shows a sequence of steps for an XA transaction with reduced overhead according to an embodiment of the present invention.

FIG. 3 is a chart showing the flow of calls when performing a transaction in a distributed database using XA protocol.

At step 302, xa_open may be called by the transaction manager to initialize one or more resource managers 122, 124 and prepare them for use in a distributed transaction environment. All participating resource managers must respond to the transaction manager to acknowledge successful performance of the xa_open routine before the transaction proceeds (or communicate an exception if the routine failed). Note that xa_open is not actually implemented by Java XA such as Oracle® WebLogic Server but is implemented in C implementations such as Oracle® Tuxedo.

At step 304, xa_start is called by the transaction manager to start one or more transaction branches and associate an XID with future work that the thread requests of the resource managers participating in the transaction. If there are multiple resource managers participating in the transaction, each resource manager is a separate branch. All participating resource managers must respond to the transaction manager to acknowledge successful performance of the xa_start routine before the transaction proceeds (or communicate an exception if the routine failed).

At step 306, the application 102 goes ahead with the transaction. For example, the application can perform a transactions in a database using by communicating with the plurality of resource managers 122-124 via a native interface such as e.g. embedded Structured Query Language (SQL) to do useful work in a database.

At step 308, xa_end is called by the transaction manager 110 to mark the end of the transaction on each transaction branch and dissociate an application thread from the transaction branches. However, as described above, when xa_end is called by the application server it is done with a special DEFERRED flag rather than the TMSUCCESS flag used currently. The use of the special DEFFERRED flag sets a flag locally on the application server 106 and does not make a remote call to the resource manager 122, 124 for xa_end.

At step 310, xa_prepare is called by the transaction manager as the first phase of the two phase commit. When xa_prepare is called by the application server the database receives the request and conducts the necessary work that would have resulted from an explicit xa_end call and then conducts the xa_prepare. All participating resource managers must respond to the transaction manager to acknowledge successful performance of the xa-end and xa_prepare routines for the transaction to succeed. Both xa_end and xa_prepare can throw XAExceptions, however, different error codes can be thrown for each different exception. The application server will inspect any XAException error codes and process appropriately.

At step 312, if one or more of the resource managers do not respond positively to the xa_prepare call, xa_rollback is called by the transaction manager.

At step 314, if all of the resource managers respond positively to the xa_prepare call, xa_commit is called by the transaction manager. As described above, in certain circumstances the xa_prepare call is unnecessary for a resource and the application server forgoes calling xa_prepare on that resource manager and the xa_end call is deferred until the xa_commit call. In such case, both xa_end and xa_commit can throw XAExceptions, however, different error codes can be thrown for each different exception. The application server will inspect any XAException error codes and process appropriately. At step 316, if one or more of the resource managers do not respond positively to the xa_commit call, depending on the XA error code returned, xa_commit will be retried or the transaction will be abandoned at step 317.

At this point the transaction has either succeeded and been committed on all participating resource managers or has failed on all participating resource managers. The transaction thus satisfies the atomicity requirement of the global transaction characterized by the four properties of atomicity, consistency, isolation, and durability (ACID).

Finally, at step 318 the transaction manager calls xa_close to all of the participating resource managers 122, 124. The above sequence of steps is performed for each transaction performed by the applications using the resources. Note however that xa_open and xa_close are typically only called on application startup and application shutdown instead rather than for each transaction. Note also that xa_open and xa_close are not actually implemented by Java XA such as Oracle® WebLogic Server but are implemented in C implementations such as Oracle® Tuxedo.

Using the steps of FIG. 3, the communications overhead of the transaction pattern is reduced by deferring the xa_end call and either bundling it with the xa_prepare call (or xa_commit call) or allowing the resource manager to determine/infer the existence of the xa_end call from the receipt of the subsequent xa_prepare call (or xa_commit call) at the resource manager thus eliminating an entire network call for each resource manager in each transaction. The elimination of an entire network call for each resource manager in each transaction reduces the communications overhead and delay compared to the transaction pattern of FIG. 2.

The present invention may be conveniently implemented using one or more general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A computer-implemented method for improving efficiency in a distributed transaction environment, the method comprising:

receiving a request from an application to end a transaction;

deferring sending of an xa_end request from a transaction manager to a resource manager;
allowing said application to transmit an xa_prepare request to the resource manager;
determining contents of said xa_end request from said xa_prepare request sent to said resource manager; and
performing on said resource manager work in response to said xa_end request and work in response to said xa_prepare request.

2. The method of claim 1, wherein:
allowing said application to transmit an xa_prepare request to the resource manager comprises allowing said application to transmit an xa_prepare request to the resource manager without waiting for a response to the deferred xa_end request.

3. The method of claim 1, wherein:
the resource manager is configured to determine/infer the existence of the xa_end request from the receipt of the subsequent xa_prepare request.

4. The method of claim 1, wherein:
the resource manager is configured to determine/infer the existence of the xa_end request from the receipt of the subsequent xa_prepare request thereby eliminating an entire network call for each resource manager in each transaction.

5. The method of claim 1, wherein:
when xa_end is called by the application it is done with a special DEFERRED flag which sets a flag locally on the transaction manager without making a remote call to the resource manager.

6. The method of claim 1, wherein:
when xa_end is called by the application it is done with a special DEFERRED flag which sets a flag locally on the transaction manager without making a remote call to the resource manager; and
when the transaction manager issues the xa_prepare request, an indication of the xa_end request is bundled with the xa_prepare request.

7. The method of claim 1, wherein:
when xa_end is called by the application it is done with a special DEFERRED flag which sets a flag locally on the transaction manager without making a remote call to the resource manager;
when the transaction manager issues the xa_prepare request, an indication of the xa_end request is bundled with the xa_prepare request; and
when the resource manager receives the xa_prepare request, the resource manager performs work that would have resulted from both an explicit xa_end request and also conducts work required by the xa_prepare request.

8. A distributed transaction environment having improved efficiency, the distributed transaction environment comprising:
an application server comprising a microprocessor and a memory;
an application operating on said application server;
a transaction manager operating on said application server; and
at least one resource manager;
wherein the distributed transaction environment is configured to perform steps comprising:
receiving a request from an application to end a transaction;
deferring sending of an xa_end request from a transaction manager to a resource manager;
allowing said application to transmit an xa_prepare request to the resource manager;
determining contents of said xa_end request from said xa_prepare request sent to said resource manager; and
performing, on said resource manager, work in response to said xa_end request and work in response to said xa_prepare request.

9. The distributed transaction environment of claim 8, further configured to:
allow said application to transmit an xa_prepare request to the resource manager comprises allowing said application to transmit an xa_prepare request to the resource manager without waiting for a response to the deferred xa_end request.

10. The distributed transaction environment of claim 8, wherein:
the resource manager is configured to determine/infer the existence of the xa_end request from the receipt of the subsequent xa_prepare request.

11. The distributed transaction environment of claim 8, wherein:
the resource manager is configured to determine/infer the existence of the xa_end request from the receipt of the subsequent xa_prepare request thereby eliminating an entire network call for each resource manager in each transaction.

12. The distributed transaction environment of claim 8, wherein:
when xa_end is called by the application it is done with a special DEFERRED flag which sets a flag locally on the transaction manager without making a remote call to the resource manager.

13. The distributed transaction environment of claim 8, wherein:
when xa_end is called by the application it is done with a special DEFERRED flag which sets a flag locally on the transaction manager without making a remote call to the resource manager; and
when the transaction manager issues the xa_prepare request, an indication of the xa_end request is bundled with the xa_prepare request.

14. The distributed transaction environment of claim 8, wherein:
when xa_end is called by the application it is done with a special DEFERRED flag which sets a flag locally on the transaction manager without making a remote call to the resource manager;
when the transaction manager issues the xa_prepare request, an indication of the xa_end request is bundled with the xa_prepare request; and
when the resource manager receives the xa_prepare request, the resource manager performs work that would have resulted from both an explicit xa_end request and also conducts work required by the xa_prepare request.

15. A non-transitory computer-readable medium including instructions stored thereon for improving efficiency in a distributed transaction environment, which instructions, when executed cause the distributed transaction environment to perform steps comprising:
receiving a request from an application to end a transaction;
deferring sending of an xa_end request from a transaction manager to a resource manager;
allowing said application to transmit an xa_prepare request to the resource manager;

determining contents of said xa_end request from said xa_prepare request sent to said resource manager; and performing on said resource manager work in response to said xa_end request and work in response to said xa_prepare request.

16. The non-transitory computer-readable medium of claim 15 including further instructions stored thereon which when executed cause the distributed transaction environment to perform steps further comprising:

allowing said application to transmit an xa_prepare request to the resource manager comprises allowing said application to transmit an xa_prepare request to the resource manager without waiting for a response to the deferred xa_end request.

17. The non-transitory computer-readable medium of claim 15 including further instructions stored thereon which when executed cause the distributed transaction environment to perform steps further comprising:

configuring the resource manager to determine/infer the existence of the xa_end request from the receipt of the subsequent xa_prepare request.

18. The non-transitory computer-readable medium of claim 15 including further instructions stored thereon which when executed cause the distributed transaction environment to perform steps further comprising:

configuring the resource manager to determine/infer the existence of the xa_end request from the receipt of the subsequent xa_prepare request thereby eliminating an entire network call for each resource manager in each transaction.

19. The non-transitory computer-readable medium of claim 15 including further instructions stored thereon which when executed cause the distributed transaction environment to perform steps further comprising:

configuring the application such that when xa_end is called by the application it is done with a special DEFERRED flag which sets a flag locally on the transaction manager without making a remote call to the resource manager.

20. The non-transitory computer-readable medium of claim 15 including further instructions stored thereon which when executed cause the distributed transaction environment to perform steps further comprising:

configuring the application such that when xa_end is called by the application it is done with a special DEFERRED flag which sets a flag locally on the transaction manager without making a remote call to the resource manager;

when the transaction manager issues the xa_prepare request, an indication of the xa_end request is bundled with the xa_prepare request; and when the resource manager receives the xa_prepare request, the resource manager performs work that would have resulted from both an explicit xa_end request and also conducts work required by the xa_prepare request.

* * * * *